July 20, 1937.　　　　　E. R. SHARP　　　　　2,087,863
PROJECTOR CABINET AND CASE
Filed Dec. 9, 1935　　　　2 Sheets-Sheet 1
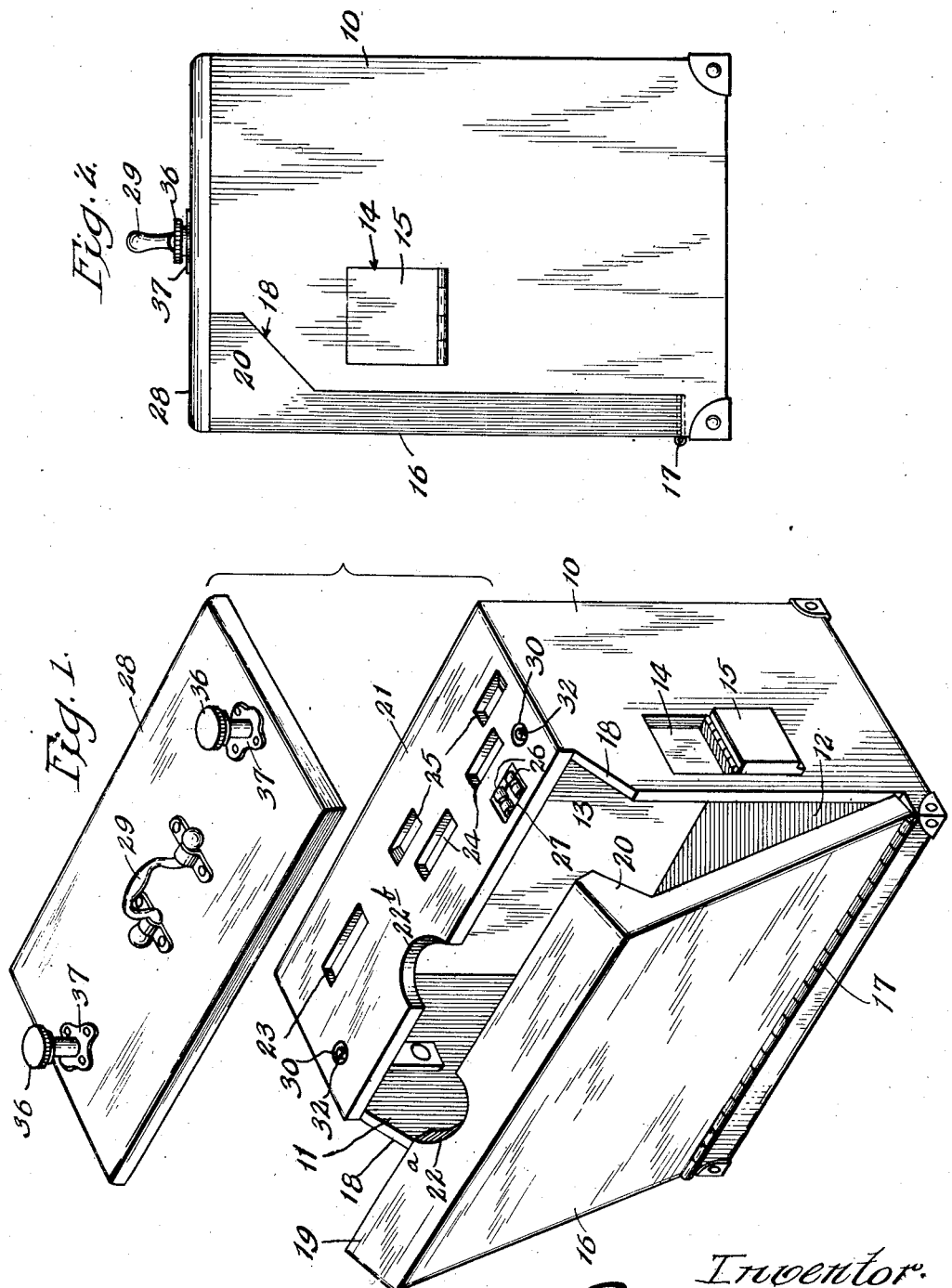

July 20, 1937.     E. R. SHARP     2,087,863
PROJECTOR CABINET AND CASE
Filed Dec. 9, 1935     2 Sheets-Sheet 2
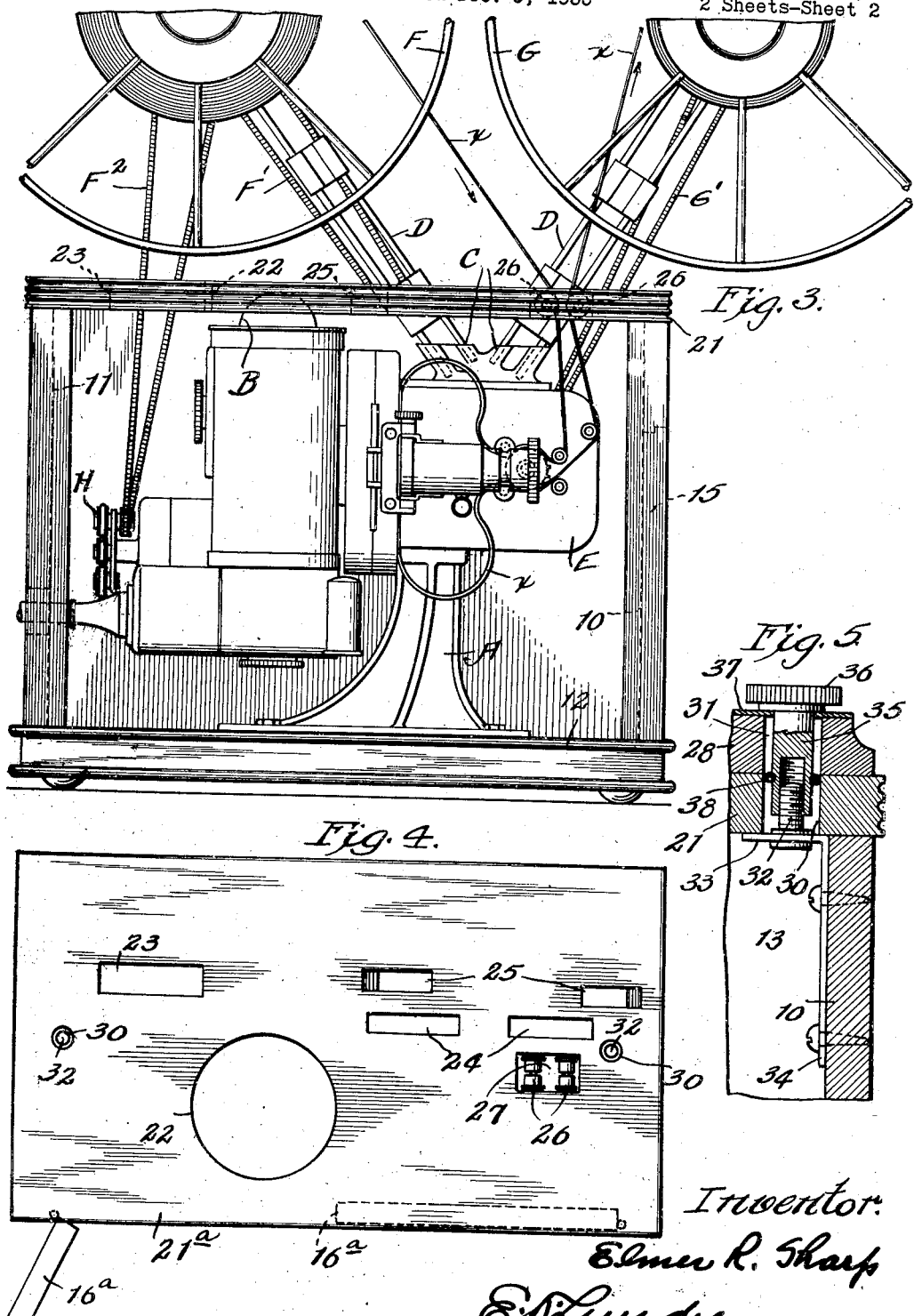

Patented July 20, 1937

2,087,863

UNITED STATES PATENT OFFICE 2,087,863

PROJECTOR CABINET AND CASE

Elmer R. Sharp, Davenport, Iowa, assignor to Victor Animatograph Corporation, Davenport, Iowa, a corporation of Iowa Application December 9, 1935, Serial No. 53,512

7 Claims. (Cl. 88—17)

My invention relates to a cabinet or case for housing and transporting a motion picture projector, the latter being of the type known as a 16 mm. projector that is especially designed for use by amateurs.

As is well known, these amateur projectors are provided with removable or extendible arms in the outer ends of which are spindles for mounting the reels containing the film. The reels, or their spindles, have pulleys which are engaged by small belts that have other portions which are engaged with drive pulleys on the body of the projector. It is also customary to provide a re-wind belt for one of the reels, which belt is usually actuated by a pulley directly associated with the motive mechanism. Cabinets and cases have, of course, heretofore been provided in which the projector and the parts are conveniently stored and in most of these structures with which I am familiar, it is customary to remove the projector from the case whenever it is desired to use the same in view of the fact that the case or cabinet is made quite compact and its restricted dimensions prevent the extension or mounting of the reel arms which usually project quite a distance from the body of the projector.

With my present structure I have designed a case or cabinet that entirely encompasses the projector and it is provided with a false top having a plurality of apertures or openings through which access may be had for the insertion of the reel arms, and for the disposition and passage of the belts, as well as for the ribbons of film. The projector is permanently mounted within the cabinet and, in order to prevent dust and accumulation of foreign matter, as well as to avoid unsightly appearance, I have provided a removable top which corresponds in outline appearance with the finish and ornamentation borne by the walls of the cabinet and which is provided with a handle to permit easy handling, and means are also provided for locking this removable top upon the combination, and preferably on the false top. For the purpose of permitting ready access to the projector, without removing it from the cabinet, the latter is provided with closure means which may be open so as to expose the operating mechanism.

When the cabinet or case is in use the removable top may be placed to one side and the apertures or openings are then exposed and are utilized for the purposes above mentioned. When the aperture is not in use the cabinet or case is entirely closed and presents a neat appearance and may be readily handled in transporting the projector from one location to another.

My invention has numerous objects in view among which may be mentioned the ease and readiness with which the structure may be operated; the compactness of the case or cabinet, the novel manner in which the structure is assembled, so that it may be manufactured and sold at a reasonable retail price without materially increasing the cost of the outfit, and the facility with which the structure may be used. Further objects, of course, will be apparent to persons skilled in the art after the construction and operation of my invention is understood from the following description.

I prefer to carry out my invention and to accomplish the numerous objects thereof in substantially the manner hereinafter fully described and as more particularly pointed out in the appended claims. Reference herein made to the accompanying drawings that form a part of this specification.

In the drawings:

Figure 1 is a perspective view showing my improved case with the parts opened or extended, the projector and its parts being omitted for the purpose of clearness.

Figure 2 is a vertical end elevation of the structure shown in Figure 1, with all of the parts closed in position for transportation.

Figure 3 is a vertical side elevation of a case made in the form of a cabinet or housing, the side door being removed and the parts of the projector being in position for use.

Figure 4 is a top plan of the cabinet showing the false top in plan with the cover member removed, the projector parts being omitted.

Figure 5 is a vertical axial section, of a fragmentary portion, showing in detail one of the locking devices for clamping the removable top to the false top.

The drawings are to be understood as being somewhat schematic for the purpose of disclosing typical or preferred forms in which my improved cabinet or case may be made; and in said drawings like reference characters identify like parts wherever said parts appear in the different views.

The structure shown in Figures 1 and 2 preferably comprises vertical front and rear walls 10 and 11 extending upwardly from the end edges of a base or bottom member 12, and there is a stationary vertical side wall 13 extending up from a longitudinal edge of the base 12. Said bottom end and side walls are connected together in any suitable manner. The front end wall 10 is provided with a projection opening 14 that is closed by a trap door 15 the near side of the housing which provides entrance to the housing is in the form of a side wall or door 16 that is movably connected to the bottom member by an elongated hinge 17 so that said side wall 16 may be swung downwardly as suggested in Figure 1.

The edges of the front and rear end walls 10 and 11 have portions thereof removed so as to provide an inclined portion 18 near the top of each of said walls. The upper edge of the movable side wall 16 is provided with a longitudinal, laterally projecting flange 19 that has irregular or triangular-shape extensions 20 that extend a short distance down the end edges of said movable wall 16. Thus an irregular shaped edge is formed along each vertical end edge of the movable wall or door 16 to fit the correspondingly shaped edges of the front and rear end walls 10 and 11.

The structure is provided with a false top wall 21 of substantially rectangular shape but of slightly less width than the bottom member 12. The edge of this top wall 21 nearest the movable wall 16 forms an abutment against which the adjacent edge of the flange 19 engages and this flange 19 and the top wall 21 are provided with substantially semi-circular recesses 22ᵃ and 22ᵇ, which, when the flange 19 abuts the adjacent edge of the top wall 21, register with each other to a circular aperture.

The movable wall or door 16 performs the usual function of a door to close the adjacent open side of the housing, and when the projector which is to be mounted upon the bottom member 12 is to be used, this door is swung downwardly to permit access to the entire interior of the housing. When the door is closed, the flange 19 of the door forms a continuation of the top wall 21 so that the upper surface of these two parts are flat and smooth.

The top wall is provided with a plurality of apertures in addition to the semi-circular recess 22ᵇ. Towards the rear there is an elongated aperture 23 to accommodate the re-wind belt of the projector and towards the front there are two longitudinally elongated alined apertures 24 for the belts that connect the reel pulleys with the drive mechanism within the housing. Alongside these apertures 24 are slots 25 preferably in longitudinal alinement with each other and having their ends that are remote to each other inclined downwardly into the housing as shown in Figure 1. These slots 25 permit the insertion and removal, as well as the positioning of the reel mount arms of the projector.

When the projector is not in use the respective belts will have been drawn down into the casing through the apertures 23 and 24 and the reel mount arms will have been removed through the slots 25. This leaves the top surface of the housing flat and clear of any projecting parts. The film, of course, has been wound upon one of the reels and conveniently stored. When in use, however, the feed and take-up lengths of the film pass over rollers 26 extending across a film opening 27. The upper segments of these rollers 26 do not project above the plane of the top surface of the housing.

After the protruding parts of the projector have been removed through their respective slots and openings and have been properly stored, the door is closed and a top wall or cover member 28 is placed upon the false top and the flange 19 of the door and secured in position in any suitable manner. This top or cover 28 is provided with a carrying handle 29 by which the structure may be manually lifted and moved from place to place. When the top-wall or cover member 28 has been secured in place its flat and smooth under surface will be secured firmly against the flat upper surface of the false top-wall 21 so that the openings in the latter are tightly closed.

Said cover member 28 also lies flat against the upper outer face of the lateral flange 19 of the door and will prevent accidental opening of the latter or even movement thereof. Thus the housing is tightly closed against entrance of foreign matter and its appearance has been improved because the openings are obscured and hidden from view. Furthermore, it will be appreciated that by employing an apertured false top-wall for mounting the accessories of the projector the interior dimensions of the housing (especially as to height) are materially reduced so that the carrying-case is of a size for convenient handling.

In Figure 5 I have shown means for clamping the two top-walls together, which means are disposed at each end of the top of the carrying case. In order to mount the clamp structure, (one of which is here described), alining holes 30 and 31 are made respectively in the false wall 21 and the covering wall 28. A threaded stud 32 is positioned axially in the hole 30 with its upper end below the upper surface of the false wall while its lower portion is anchored upon the horizontal lateral arm 33 of an angle metal bracket 34 that is secured to the adjacent inner surface of a vertical wall of the housing so that said arm projects across the lower end of the hole 30.

An internally threaded sleeve 35, longer than the thickness of the cover top-wall 28 is rotatably mounted in the hole 31 of the cover top-wall. The length of this sleeve permits its lower portion to enter the hole 30 and be threaded onto the screw stud by rotating the head or thumb-piece 36 on the upper protruding end of said sleeve. This sleeve is loose in the hole 31 and in order to maintain the same against removal a retainer plate 37 is secured to the outer face of the cover wall and is provided with a guide opening of sufficient diameter to accommodate the smooth shank of the sleeve. A spring wire retainer ring 38 is snapped into an annular groove in a convenient portion of the sleeve, which ring acts as a stop to prevent withdrawal of the sleeve through the opening in the plate 37.

In Figures 3 and 4 there is shown a housing in the form of an ornamental cabinet that corresponds in general arrangement with the structure hereinbefore explained. The operating side of this cabinet is, however, slightly different from that shown in Figures 1 and 2. In this connection the false top-wall 21ᵃ is of the same area as the bottom member and the side of the cabinet next the operator is provided with two vertically hinged doors 16ᵃ (omitted in Fig. 3).

The cover top-wall 28 and the clamping devices are the same as in the carrying-case type and the large circular opening 22 is continuous and not divided as in the previously described structure.

The projector is shown in Figure 3 and consists briefly of a standard A that is bolted to the bottom 12 of the cabinet so that the deflector B on top of the lamp house is disposed in the circular opening of the false top. The sockets C for the reel arms D are on top of a portion of the hollow casting E that encloses parts of the actuating mechanism. The film x unwinds from the supply reel F and, after passing into the housing over one of the rollers 26, is moved intermittently past the projection aperture of the projector, and then leaves the housing over the other roller 26 to be wound upon the take-up reel G. The drive belts F' and G' for the respective reels move through the apertures 24 and the rewind belt F² extends from the reel F through aperture 23 to the rewind mechanism H at the rear of the motor.

What I claim is:

1. A structure as described comprising a motion-picture projector body, a housing embodying a base on which said body is mounted, a fixed vertical side wall and vertical end walls extending laterally therefrom, a movable side wall opposite said fixed side wall, a top wall above said body having a plurality of openings, reel-mount arms inserted through said openings and removably supported on said body, a top plate adapted to be disposed flat upon said top wall and covering said openings, and means removably anchoring said plate upon said top wall.

2. A structure as described comprising a motion-picture projector body, a housing embodying a base on which said body is mounted, opposite vertical side walls one of which is movable, vertical end walls extending between said side walls, a top wall having a plurality of openings, reel-mount arms adapted for insertion through said openings and removably supported on said body, a top plate adapted to be disposed flat upon said top wall and covering said openings, and means removably anchoring said plate upon said top wall.

3. A structure as described comprising a motion-picture projector body, a housing embodying a base on which said body is mounted, a fixed vertical side wall and vertical end walls extending laterally therefrom, a movable side wall opposite said fixed side wall, a top wall above said body having a plurality of openings, reel-mount arms inserted through said openings and removably supported on said body, a top plate adapted to be disposed flat upon said top wall and covering said openings, and fastening means operable from the exterior of said plate for anchoring the latter upon said top wall.

4. A structure as described comprising a motion-picture projector body, a housing embodying a base on which said body is mounted, opposite vertical side walls one of which is movable, vertical end walls extending between said side walls, a top wall having a plurality of openings, reel-mount arms adapted for insertion through said openings and removably supported on said body, a top plate adapted to be disposed flat upon said top wall and covering said openings, and fastening means operable from the exterior of said plate and disposed through the latter and said top wall for anchoring said plate in position.

5. A housing for a motion-picture projector embodying a bottom supporting the projector body, opposite vertical side walls one of which is fixed, vertical end walls extending between said side walls, a top wall having a plurality of openings facilitating disposition of instrumentalities of the projector outside said housing, a top plate adapted to be disposed upon said top wall to cover said openings, said top plate and said top wall having alined apertures, and fastening devices disposed in said alined apertures and operable from the exterior of said top plate for anchoring said plate in position.

6. A housing for a motion-picture projector embodying a bottom supporting the projector body, opposite vertical side walls one of which is fixed, vertical end walls extending between said side walls, a top wall having a plurality of openings facilitating disposition of instrumentalities of the projector outside said housing, a top plate adapted to be disposed upon said top wall to cover said openings, said top plate and said top wall having alined apertures, fastening devices disposed in said alined apertures and operable from the exterior of said top plate for anchoring said plate in position, and a handle on said top plate whereby the housing is supported by said top plate in transportation from place to place.

7. A housing for a motion-picture projector embodying a bottom supporting the projector body, opposite vertical side walls one of which is fixed, vertical end walls extending between said side walls, a top wall having a plurality of openings facilitating disposition of instrumentalities of the projector outside said housing, a top plate adapted to be disposed upon said top wall to cover said openings, said top plate and said top wall having alined apertures, interengaging threaded members disposed in said openings portions of which members are operable from the exterior of said top plate, and bracket elements below said apertures to which other portions of said members are secured.

ELMER R. SHARP.